Patented Sept. 22, 1953

2,653,146

UNITED STATES PATENT OFFICE 2,653,146

TREATMENT OF BETA-METHYLENE-BETA-PROPIOLACTONE COPOLYMERS

Hugh William Gray, Wilmington, and Clement Walter Theobald, Roselle, Del., assignors to E. I. du Pont de Nemours & Company, Wilmington, Del., a corporation of Delaware No Drawing. Application December 7, 1950, Serial No. 199,722

7 Claims. (Cl. 260—85.5)

This invention relates to the treatment of beta-methylene-beta-propiolactone copolymers and to the novel products obtained thereby.

There are disclosed and claimed in U. S. application Serial No. 122,839 filed October 21, 1949, in the name of D. D. Coffman, issued February 12, 1952 as U. S. Patent 2,585,537 new copolymers of beta-methylene-beta-propiolactone with another copolymerizable ethylenically unsaturated compound, such copolymers unexpectedly being characterized by the presence of the beta-propiolactone ring, e g.,

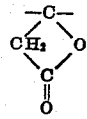

wherein a ring carbon is also part of the main polymer chain, and being free of pyrone rings. These copolymers are obtained by copolymerizing the two components in the presence of a polymerization catalyst yielding unstable free radicals.

An object of the present invention is to provide a method of treating the aforementioned beta-methylene-betapropiolactone copolymers to form new products. A further object is to provide new and useful products derived from these copolymers. A still further object is to provide a process of treating these copolymers whereby at least an appreciable proportion of the beta-propiolactone rings therein are cleaved to give new products. Other objects will be apparent from the description of the invention given hereinafter.

The above objects are accomplished according to the present invention by reacting a copolymer of beta-methylene-beta-propiolactone and another copolymerizable ethylenically unsaturated compound, said copolymer containing beta-propiolactone rings, with an active hydrogen-containing compound whereby at least an appreciable proportion of said beta-propiolactone rings are cleaved.

The new class of polymeric products of this invention may be broadly considered to be beta-hydroxy carboxylic acid derivatives. Infra-red and other data indicate that they contain structural units having a hydroxyl group linked to a chain carbon atom to which there is also attached the radical,

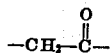

through its methylene group.

These new polymeric products are readily obtained by reacting a copolymer of beta-methylene-beta-propiolactone and another copolymerizable ethylenically unsaturated organic compound with at least 0.01 mole of chemically combined beta-methylene-beta-propiolactone in the copolymer, of a compound containing active hydrogen attached to an element of groups V or VI of the periodic table and having an atomic number of 7 through 16, i. e., nitrogen, oxygen, phosphorus, and sulphur, in solution in an organic liquid at a temperature of 20° C. to 175° C. Preferably, from 0.3 to 0.8 mole of the active hydrogen-containing compound is used and the reaction is carried out at a temperature between 25° C. and 100° C. and at atmospheric pressure or autogenous pressure, for a period of at least one hour in the presence of 0.001% to 20%, by weight of the copolymer, of a catalyst; more preferably, in the presence of 0.01% to 10% of the catalyst.

In one practical embodiment, the products of this invention can be made by adding the active hydrogen-containing compound to a solution of the beta-methylene-beta-propiolactone/ethylenically unsaturated organic compound containing a catalytic amount of an acidic or basic material and allowing the mixture to stand at room temperature with agitation until the desired degree of modification has been obtained or else by heating the mixture at a temperature which may be as high as 175° C.

The products are isolated from the reaction mixture by evaporation of the solvent, by precipitation with a non-solvent, or by other methods known to those skilled in the art.

The present invention resides in large measure in the surprising discovery that the beta-propiolactone units contained in the polymeric molecule may be cleaved, or at least that these beta-propiolactone units could be cleaved readily under practical conditions. While it was known heretofore that monomeric compounds containing a beta-propiolactone ring could be reacted with active hydrogen-containing compounds to cleave the ring, it was not foreseeable that propiolactone rings in which a carbon of the ring was also a carbon of the main polymer chain of a polymer, could be readily reacted with an active hydrogen-containing compound. It has now been found that this reaction may be readily effected to give new polymeric products having a wide range of utility.

The following examples illustrate specific embodiments of the present invention.

Example I

A solution of 4 g. of a vinyl chloride/beta-methylene-beta-propiolactone copolymer having a vinyl chloride to beta-methylene-beta-propiolactone mole ratio of 5.4 to 1, in 50 cc. of dioxane was prepared and treated with 3 g. of 100% hydrazine. The mixture was allowed to stand at room temperature overnight and thereafter precipitated with methanol. The product was redissolved in dioxane, reprecipitated, washed, and dried in an oven at 70° C. Two analyses showed the material to contain 2.38% and 2.44% nitrogen, definitely indicating cleavage of the beta-propiolactone rings. In contrast to the untreated copolymer, the reaction product, after oven treatment, was no longer soluble in ketone solvents or in dioxane.

Example II

A solution of the vinyl chloride/beta-methylene-beta-propiolactone copolymer of Example I in dioxane, containing 10% hexamethylenediamine, based on the copolymer, was cast into a film and baked for ten minutes at 50° C. The resulting colorless film was softened but did not become tacky when treated with a 50:50 mixture of xylene/methyl isobutyl ketone solvent. The film had a bending modulus of 258,000 lbs./sq. in. and a tensile/elongation of 6000/2.4%. In contrast the untreated film was brittle and too fragile to be stripped from the support on which it was cast.

Example III

A 2 g. sample of a 24 to 1 acrylonitrile/beta-methylene-beta-propiolactone copolymer was dissolved in 18 g. of dimethylformamide and treated with 0.5 g. of hexamethylenediamine. The solution set to a stiff gel within one hour. A solution of the copolymer without the diamine remained fluid for 65 hours or more, with only a minor increase in viscosity and no development of gelation. Upon addition of hexamethylenediamine to the aged solution, gelation occurred in less than 45 minutes. A solution of polyacrylonitrile in dimethylformamide was unchanged in viscosity after 65 hours standing, irrespective of whether or not hexamethylenediamine was added.

Example IV

The solution of the acrylonitrile/beta-methylene-beta-propiolactone copolymer of Example III was treated with an excess of N,N-dimethyltrimethylenediamine and permitted to stand for six hours. Films cast from this solution were baked, stripped, and boiled exhaustively for several hours to remove excess solvent and reactant. Test dyeings made by boiling strips of film in dye baths containing 0.025% of a light red acid dyestuff and 0.25% sodium sulfate at pH 0.9, 2.4, 3.9, and 7.2 showed that dyeing was accomplished readily at all these degrees of hydrogen ion concentration. This is in marked contrast to the behavior of polyacrylonitrile which is difficult to dye.

Example V

A solution of 5.85 g. of N,N-dimethyltrimethylene-diamine in 200 cc. of dioxane was prepared and two 5 cc. portions were analyzed and found to be equivalent to 28.4 and 28.5 cc. of 0.0994 normal HCl. To the remaining 190 cc. of solution there was added 10 g. of a 29 to 1 acrylonitrile/beta-methylene-beta-propiolactone copolymer ground to pass a sixty mesh screen and the resulting suspension was refluxed for one hour and twenty minutes. The suspension was filtered and a 5 cc. portion of the remaining solution titrated 24.64 cc. of 0.0994 normal HCl. This corresponds to a utilization of 14.36 milliequivalents or 0.74 g., or approximately one amine molecule per beta-methylene-beta-propiolactone group in the polymer.

Example VI

A 1 g. sample of a 1:1 maleic anhydride/beta-methylene-beta-propiolactone copolymer heated on a steam bath for twenty minutes with 10 cc. of 5.059% normal sodium hydroxide consumed 13.57 milliequivalent of alkali, as indicated by back titration. This corresponds to an acid number of 754. A 0.19 g. sample of the same polymer titrated directly with alkali had an acid number of 545. The saponification number was then 209, corresponding to the reaction of about two-thirds of the lactone rings under the conditions employed.

Example VII

A 4 g. sample of a vinyl chloride/beta-methylene-beta-propiolactone copolymer containing 49.71% chlorine and having a mole ratio of vinyl chloride to beta-methylene-beta-propiolactone of 9.6:1 was dissolved in 15 cc. of dioxane and 5 cc. of 5.059 normal sodium hydroxide was added. The mixture was placed in a closed vessel and permitted to stand for sixteen hours at room temperature. Upon titration, 12.91 cc. of 1.534 normal HCl was required to neutralize the excess alkali. The product was filtered and washed carefully with distilled water until no more chloride could be detected in the filtrate. The washings and filtrate were made up to 500 cc. with water and analyzed for chloride ion; found 0.15 g./100 cc. From the following calculations it can be seen that 4.17 milliequivalent of alkali were consumed in the neutralization of the acid formed in the hydrolysis of the lactone.

$$\text{Meq. NaOH added} = 5.0 \times 5.059 = 25.295$$
$$\text{Meq. NaOH in excess} = 12.91 \times 1.534 = 19.804$$
$$\text{Meq. NaOH consumed} = 5.491$$
$$\text{Meq. Cl}^- \text{ formed} = \frac{500 \times 0.15}{100} + 0.0355 = 21.12$$
$$\text{Meq. Cl}^- \text{ added as HCl} = 12.91 \times 1.534 = 19.80$$
$$\text{Meq. Cl}^- \text{ removed from polymer as NaCl} = 1.32$$
$$\text{Meq. NaOH consumed in saponification} = 5.491 - 1.32 = 4.171$$

The above figures correspond to a saponification number of 58.5. The calculated saponification number based on chlorine analysis of the original polymer is 81.9. Approximately 71% of the lactone groups underwent hydrolysis under the relatively mild conditions described above.

Example VIII

An ethylene/beta-methylene-beta-propiolactone copolymer (1.50 g.) was treated with an excess of butyl mercaptan (6.57 g.) and a trace (0.10 g.) of triethylamine at 150° C. under 8500 atms. pressure. The product was isolated by precipitation in methanol and purified by dissolving it in benzene and reprecipitating with methanol. A nearly odorless glassy resin, fluid at 75° C., was obtained by this process. Analysis showed the product to contain 7.07% sulfur.

Example IX

One hundred sixty g. of isoamyl alcohol and 18.2 g. of a 1:1 maleic anhydride/beta-methylene-beta-propiolactone copolymer were stirred together under reflux for 10 hours. The reaction temperature was 125° C. and the solution was clear throughout the heating cycle. The product was recovered by pouring the reaction mixture into about 500 g. of petroleum ether. The soft, sticky mass was dried on a steam bath to yield a yellow, brittle solid. The product was insoluble in water but readily soluble in 14% ammonia solution. It was also soluble in pyridine. After drying to constant weight in a vacuum desiccator, 13.6 g. of product was recovered, which corresponds to about a 50% conversion. The dried product was soluble in acetone and yielded yellow colored, flexible films which did not soften when soaked in water. The product analyzes 61.6% carbon and 8.07% hydrogen, precipitates gelatin in the pH range 5 to 10 thus indicating its suitability as a tanning agent candidate, and shows binding properties for pigments in paper coating tests. The infra-red spectrum of the product shows bands for ester groups but not for the beta-methylene-beta-propiolactone or anhydride groups.

*Example X*

A solution of 20 g. of an ethylene/beta-methylene-beta-propiolactone copolymer having a mole ratio of 23/1, in 160 g. of a 1 to 1 toluene/dioxane mixture was treated with a concentrated solution of potassium hydroxide (10 g.) in methanol. The mixture was refluxed for two hours while the methanol was allowed to distill out. The solution of the hydrolyzed product was then poured into water and acidified. When washed with methanol and dried, the product had an acid number (milligrams potassium hydroxide per g. sample) of 69 and 71. This acid number corresponds to a mole ratio of ethylene/beta-methylene-beta-propiolactone of 25/1. Products prepared in a similar fashion from a variety of samples of ethylene/beta-methylene-beta-propiolactone copolymers were found to have substantially identical acid and hydroxyl numbers and were readily dispersible in alkali.

It will be understood that the above examples are merely illustrative and the present invention broadly comprises reacting a copolymer of beta-methylene-beta-propiolactone and another copolymerizable ethylenically unsaturated compound, the copolymer containing beta-propiolactone rings, with an active hydrogen-containing compound whereby at least an appreciable proportion of the beta-propiolactone rings are cleaved, and the modified polymers formed by this reaction.

The beta - methylene - beta - propiolactone/ethylenically unsaturated compound copolymers used in the present invention are those disclosed in said U. S. application Serial No. 122,839. The mole ratio of beta-methylene-beta-propiolactone to polymerizable ethylenically unsaturated organic compound monomer in these copolymers, can be varied from 1:99 to 99:1. The preferred products, however, are those in which this ratio is from 1:1 to 1:50.

A typical preparation of one of these copolymers is the following: A solution of 20 g. of acrylonitrile, 20 g. of beta-methylene-beta-propiolactone, and 0.1 g. of azobisisobutyronitrile in 80 g. of benzene was refluxed for 4 hours. The reaction mixture became cloudy as it approached its reflux temperature of approximately 80° C. The polymer was filtered from the reaction mixture, washed with fresh benzene and oven dried to yield 6.7 grams of a cream-colored, finely pulverized solid. The product analyzed 22.27, 22.14% N, which corresponds to a product containing an acrylonitrile/beta - methylene - beta - propiolactone mole ratio of 8:1. The calculated nitrogen content of a product having the molecular formula $C_{28}H_{28}N_8O_2$ is 22.0%.

Another typical preparation of one of these copolymers is the following: A 5 liter reactor, equipped with a stirrer, condenser, and nitrogen inlet tube was charged with 7527 cc. of water and 480 g. of acrylonitrile. The reactor was swept with nitrogen, agitation started, and 200 g. of beta-methylene-beta-propiolactone, 4 g. of ammonium persulfate, and 8 g. of sodium metabisulfite were added in rapid succession. Polymerization started immediately and the temperature rose to a maximum of 46° C., where it was maintained by external cooling. After the initial rapid reaction, the temperature was held at 40° C. for a total of 6 hours. The product was filtered, washed with water till neutral, and then with methanol. The washed material was dried under vacuum at 70° C. There were thus obtained 485 g. of product having an intrinsic viscosity (measure at 0.20% concentration in dimethyl formamide at 25° C.) of 1.78. The product analyzed 24.59% nitrogen, which corresponds to a beta-methylene-beta-propiolactone content of 6.9%.

The polymerizable ethylenically unsaturated organic compounds used in the preparation of the copolymers of this invention are the compounds containing the group >C=C< and which, in accord with the present state of the art, are recognized as being capable of undergoing a polymerization reaction involving addition across the ethylenic double bond, which reaction is catalyzed by peroxy compounds. Examples of compounds of this type are ethylene, propylene, the butylenes and vinylidene and vinylene compounds, e. g., vinyl fluoride, vinyl chloride, vinyl acetate, vinylidene fluoride, vinylidene chloride, vinyl propionate, vinyl benzoate, vinyl isobutyrate, methyl vinyl ketone, methyl isopropenyl ketone, methyl acrylate, acrylonitrile, methacrylonitrile, acrylic and methacrylic acids, etc., trifluoroethylene, tetrafluoroethylene, allyl compounds, e. g., allyl ethers and esters, such as diallyl phthalate, etc., maleic and fumaric acids and their esters, maleic anhydride, etc. Combinations of one or more of the above may be copolymerized with the beta-methylene-beta-propiolactone, if desired. The vinylidene and vinylene compounds are preferred because the most satisfactory results from the standpoint of yield, copolymer quality, and reaction rate are obtained with them. It is understood that the term vinylidene is used herein in the generic sense to include vinyl compounds. It is to be understood also that the term vinylene refers to components having the bivalent radical —CH=CH—. Typical examples of this latter class are maleic and fumaric acids and their esters, maleic anhydride and higher alkenes such as 2-butene.

In the preparation of the modified polymers of this invention, there may be used any compound containing active hydrogen as determined by the Zeriwitinoff-Tschugaeff method. The preferred active hydrogen compounds are those in which the active hydrogen is attached to an element of group V or VI of the periodic table and having an atomic number of 7 through 16, and especially useful are those active hydrogen containing compounds in which the active hydrogen is linked directly to the element of group V or VI of the periodic table of atomic number 7 through 16. Specific compounds usefully employable in the practice of this invention are hydrogen sulfide, mercaptans, e. g., ethanethiol, butanethiol, heptanethiol, dodecanethiol, octadecenethiol, 1,2 - ethanedithiol, 1,4-butanedithiol, 1,6-hexanedithiol, thiophenol, cyclohexanethiol, 3-methyl-cyclohexanethiol, 3-methylcyclohexylmethanethiol, 2-naphthalenethiol, and 8-quinolinethiol, alcohols such as methanol, ethanol, heptanol-1, decanol-1, and octadecanol-1, aminoalkanols, e. g., aminoethanol, N-methylaminoethanol, and N-diethylaminoethanol, phenol, toluol, and naphthol, water, hydrogen chloride, sulfuric acid, phosphoric acid, phosphine, phosphinic and phosphonic acids, acetylene, ammonia, amines, e. g., methylamine, butylamine, decylamine, octadecylamine, dimethylamine, N, N,-dimethyltrimethylenediamine, methyl ethylamine, benzylamine, aniline, N-methylaniline, toluidine, and naphthylamine, malonic acid and its esters, and acetoacetic ester.

The amount of active hydrogen compound employed depends upon the degree of modification desired. As a rule, a proportion of active hydrogen-containing compound amounting to at least 0.01 mole per mole of chemically combined beta-methylene-beta-propiolactone in the copolymer is needed to bring about an appreciable degree of modification of the copolymer. If complete modification of the copolymer is desired, then at least one mole of the active hydrogen containing compound is used per mole of chemically combined beta - methylene - beta-propiolactone in the copolymer. Substantial modification is obtained employing between 0.3 and 0.8 mole of the active hydrogen-containing compound per beta-propiolactone unit in the copolymer and this represents the amount of active hydrogen compound generally used. If desired, two or more active hydrogen-containing compounds may be used and these may be employed in admixture or in sequence. In the latter case, part of the beta-propiolactone units in the copolymer are reacted with one active hydrogen-containing compound first and then part or all of the remaining units are reacted with the other active hydrogen-containing compound. In this way, products having properties tailored for specific uses can be obtained.

The time of reaction depends upon the nature of the active hydrogen-containing compound, the temperature, and catalyst. Generally, the reaction is conducted for at least one hour under optimum conditions of temperature, catalyst and catalyst concentration. In some instances, times of reaction up to 24 hours are employed in order to realize the degree of modification desired.

The products of this invention may be made at temperatures in the range of 20° C. to 175° C. As a rule, a satisfactory rate of reaction with good product yield is obtained at temperatures of from 25° C. to 100° C. and this therefore represents the preferred operating temperature range.

The reaction proceeds satisfactorily at atmospheric pressure or under autogenous pressure and the products are normally made that way. In some instances, it may be desirable to apply external pressure and resort may be had to such means when needed and/or desired.

In the preparation of the products of this invention, a catalyst can be used to increase the rate of reaction. As catalysts, there can be used acidic or basic materials. The preferred catalysts, because of the better reaction rates and yields of desired products, are the basic materials. Examples of suitable acidic catalysts are those of the Friedel-Crafts type such as $AlCl_3$ and $FeCl_3$, and $ZnCl_2$, $BF_3$, phosphoric acid, and sulfuric acid. Suitable basic materials are sodium hydroxide, sodium alkoxides, e. g., sodium ethoxide, and propoxide. Sodium hydroxide can function as the active hydrogen-containing compound or, in lesser proportions, as a catalyst.

The amount and type of catalyst employed depends upon the nature of the active hydrogen compound employed. Usually amounts of from 0.001% to 20% by weight of the beta-methylene-beta - propiolactone/ethylenically unsaturated organic compound copolymer is employed. It is preferred to use from 0.01% to 10% of catalyst.

The reaction is conveniently carried out with the reactants dissolved in an organic liquid. This is not essential and the active hydrogen-containing compound may itself be a satisfactory solvent for the copolymer. This is illustrated in Examples VIII and IX where the copolymers were dissolved in an excess of butyl mercaptan and isoamyl alcohol, respectively. Suitable organic solvents include dioxane and dimethyl formamide.

The modified copolymers of this invention are adapted for use in a wide variety of applications since by selection of the starting copolymer and the modification treatment products of greatly differing properties can be prepared. These products are particularly useful in the preparation of films and fibers and paper adhesives.

As many apparently widely different embodiments of this invention may be made without departing from the spirit and scope thereof, it is to be understood that the invention is not limited to the specific embodiments thereof except as defined in the appended claims.

The invention claimed is:

1. Process which comprises reacting a copolymer of beta-methylene-beta-propiolactone and another copolymerizable organic compound containing ethylenic unsaturation, said copolymer containing beta-propiolactone rings wherein a ring carbon is also part of the main polymer chain, and being free of pyrone rings, with at least 0.01 mole of a compound containing active hydrogen as determined by the Zerewitnoff-Tschugaeff method, from the group consisting of ammonia, amines, and hydrazine per mole of chemically combined beta-methylene-beta-propiolactone in said copolymer at a temperature of 20° C. to 175° C., until at least an appreciable proportion of said beta-propiolactone rings are cleaved.

2. Process as set forth in claim 1 wherein said compound containing active hydrogen is present in an amount of 0.3 to 0.8 mole per mole of chemically combined beta-methylene-beta-propiolactone in said copolymer and said reaction is carried out at a temperature of 25° C. to 100° C. for a period of at least one hour.

3. Process as set forth in claim 2 wherein said copolymer is a copolymer of beta-methylene-beta-propiolactone and vinyl chloride.

4. Process as set forth in claim 2 wherein said copolymer is a copolymer of beta-methylene-beta-propiolactone and acrylonitrile.

5. A modified copolymer of beta-methylene-beta-propiolactone and another copolymerizable organic compound containing ethylenic unsaturation, said copolymer being obtained by the process set forth in claim 1.

6. A modified copolymer of beta-methylenebeta-propiolactone and vinyl chloride, said copolymer being obtained by the process set forth in claim 3.

7. A modified copolymer of beta-methylene-beta-propiolactone and acrylonitrile, said copolymer being obtained by the process set forth in claim 4.

HUGH WILLIAM GRAY.
CLEMENT WALTER THEOBALD.

References Cited in the file of this patent

UNITED STATES PATENTS

| Number | Name | Date |
|---|---|---|
| 2,560,694 | Howard | July 17, 1951 |

OTHER REFERENCES

Marvel et al., J. A. C. S., Vol. 61, July 1939, pages 1682–1684